United States Patent [19]

Kumura et al.

[11] Patent Number: 4,583,627

[45] Date of Patent: Apr. 22, 1986

[54] VEHICLE/ENGINE OPERATIONAL PARAMETER RESPONSIVE CLUTCH CONTROL

[75] Inventors: Haruyoshi Kumura, Yokohama; Sigeaki Yamamuro, Zushi; Yoshikazu Tanaka, Yokohama; Hiroyuki Hirano; Keiju Abo, both of Yokosuka, all of Japan

[73] Assignee: Nissan Motor Co., Ltd., Yokohama, Japan

[21] Appl. No.: 544,066

[22] Filed: Oct. 20, 1983

[30] Foreign Application Priority Data

Oct. 22, 1982 [JP] Japan .................... 57-184628
Sep. 6, 1983 [JP] Japan .................... 58-162651

[51] Int. Cl.⁴ .................................... B60K 41/02
[52] U.S. Cl. ...................... 192/0.076; 192/0.096; 192/103 R
[58] Field of Search .............. 192/0.076, 0.075, 0.096, 192/103 R; 361/242; 74/731, 732, 730, 865

[56] References Cited

U.S. PATENT DOCUMENTS

| | | | |
|---|---|---|---|
| 3,004,447 | 10/1961 | Sand | 192/0.076 |
| 3,951,009 | 4/1976 | Audifferd et al. | 192/3.57 |
| 4,295,551 | 10/1981 | Zimmerman et al. | 192/0.076 |
| 4,459,878 | 7/1984 | Frank | 74/865 |
| 4,478,105 | 10/1984 | Yamamuro et al. | 74/730 |

Primary Examiner—George H. Krizmanich
Attorney, Agent, or Firm—Schwartz, Jeffery, Schwaab, Mack, Blumenthal & Evans

[57] ABSTRACT

A control system for a hydraulic clutch comprises a starting valve and a complete engagement control valve coupled with the starting valve. The starting valve supplies to the clutch a regulated fluid pressure which is elevated in accordance with a revolution speed of an engine when it is in a start fluid pressure regulating state and which is higher than the regulated fluid pressure provided in said start fluid pressure regulating state when it is in said complete engagement fluid pressure regulating state when it is in a complete engagement fluid pressure regulating state. The complete engagement control valve shifts the starting valve from the start fluid pressure regulating state to the complete engagement fluid pressure regulating state when the vehicle speed exceeds a complete engagement vehicle speed.

6 Claims, 28 Drawing Figures

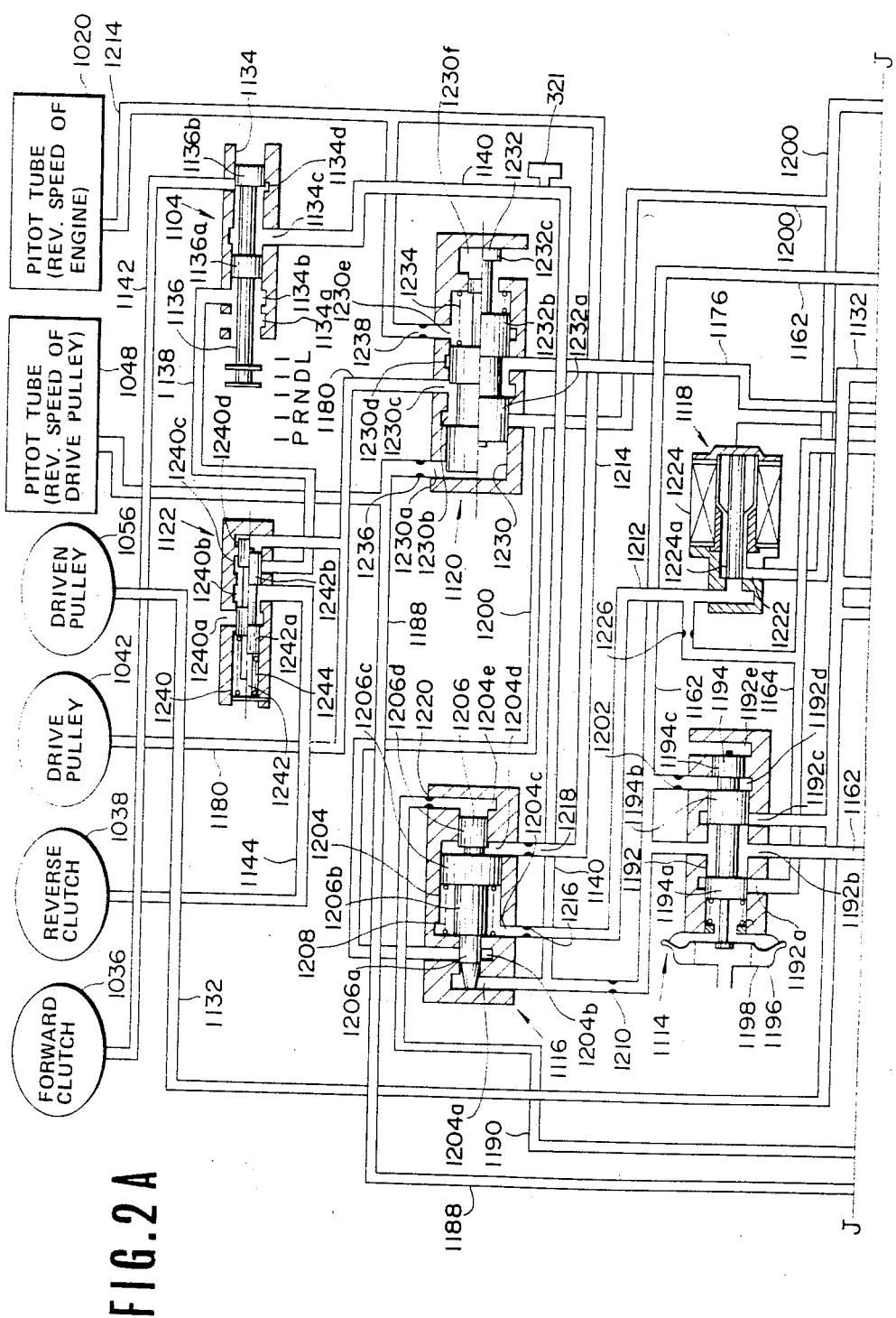

TO STEP 601 OF FIG. 5(a)

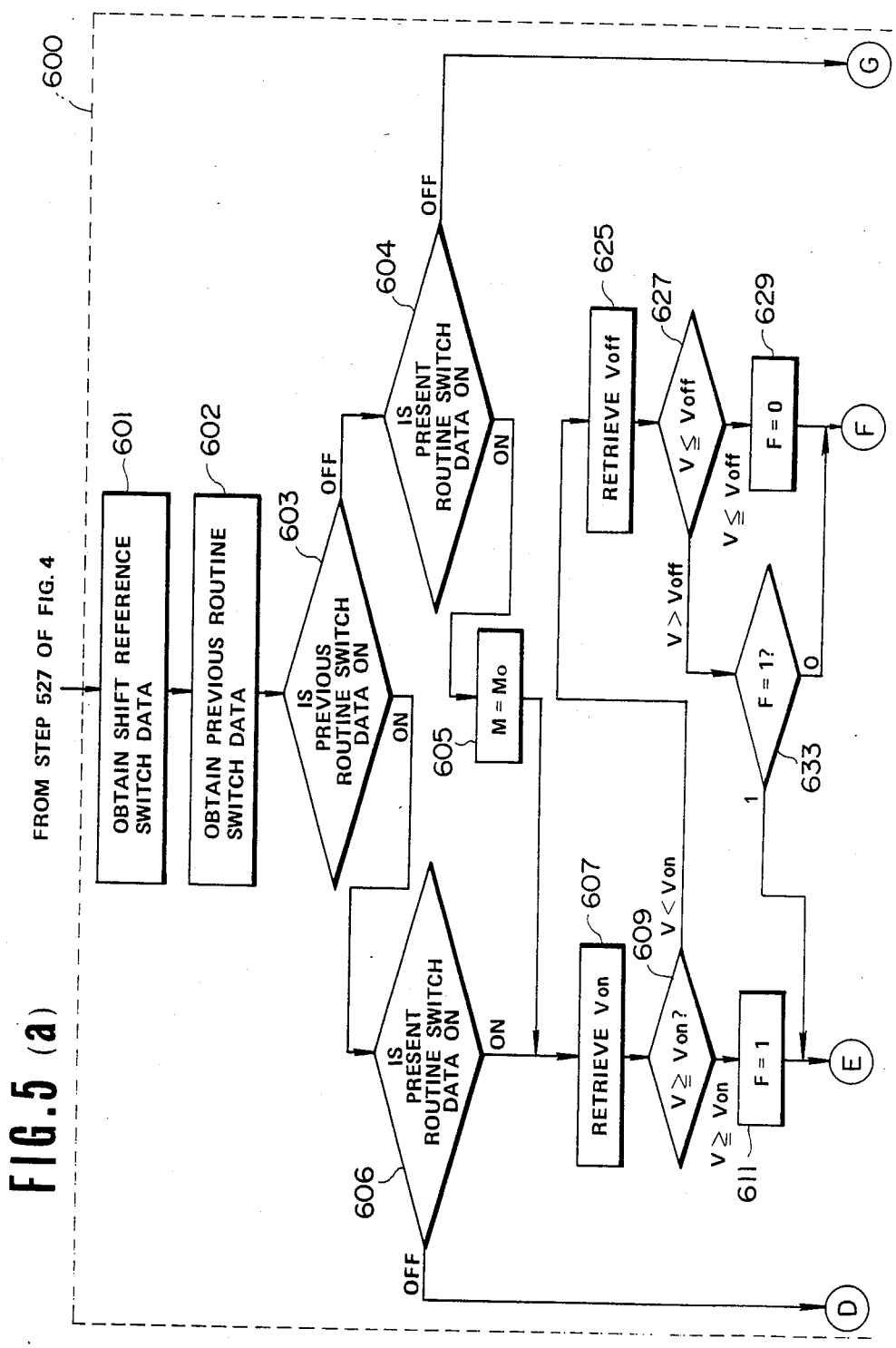

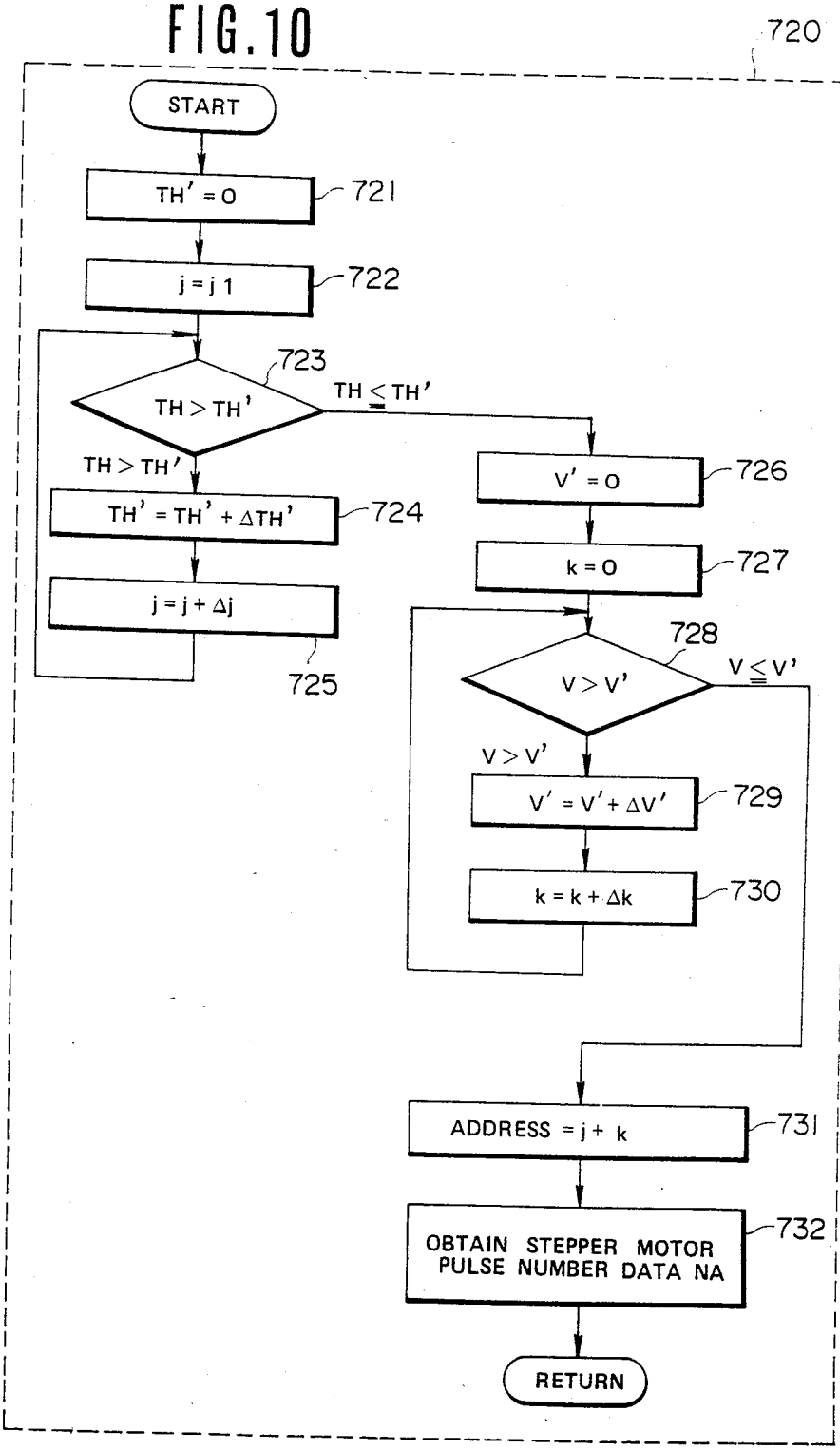

| | A | B | C | D |
|---|---|---|---|---|
| 317 a | H | L | L | H |
| 317 c | H | H | L | L |
| 317 b | L | H | H | L |
| 317 d | L | L | H | H |

⟶ UPSHIFT
⟵ DOWNSHIFT

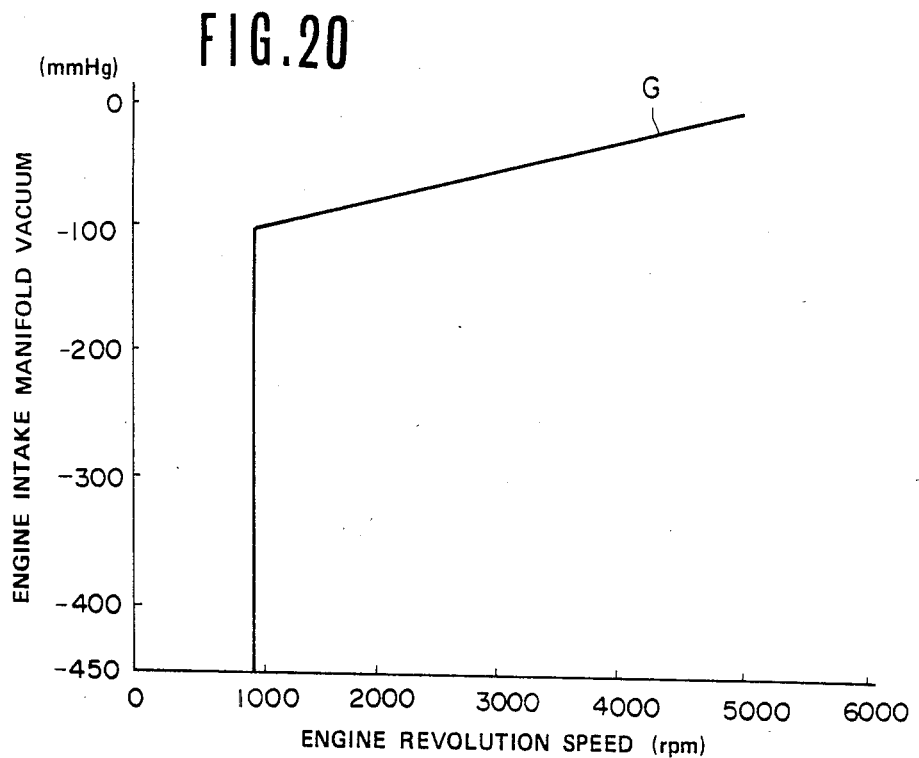
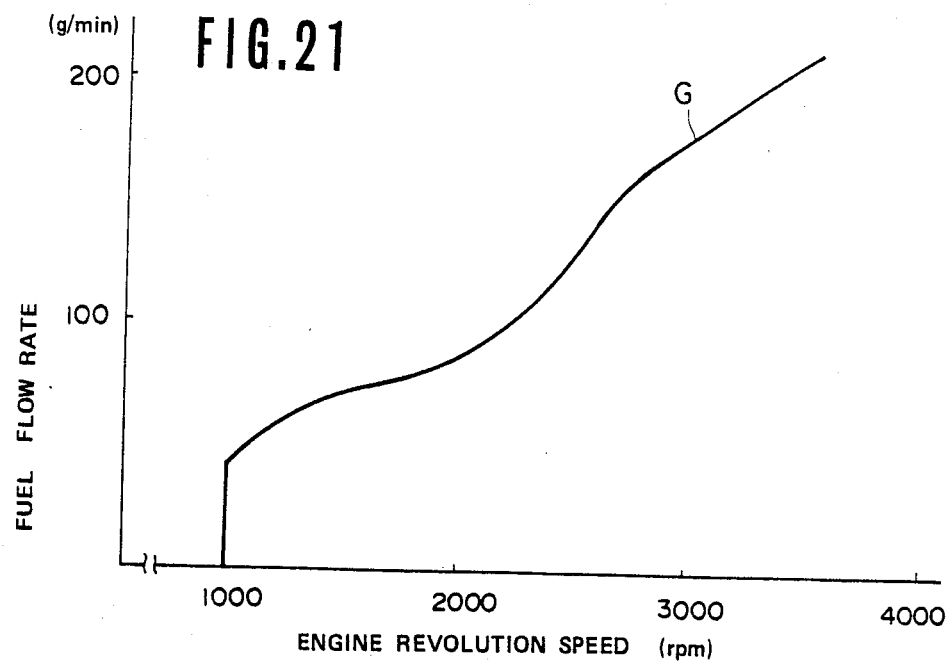

TO STEP 601 OF FIG. 23(a)

VEHICLE/ENGINE OPERATIONAL PARAMETER RESPONSIVE CLUTCH CONTROL

CROSS-REFERENCE TO RELATED APPLICATIONS

Reference is made to co-pending U.S. patent application Ser. No. 489,600 filed Apr. 28, 1983 now U.S. Pat. No. 4,579,021. Reference is also made to the following related co-pending applications, each filed by the same applicants concurrently with the present application: U.S. patent application Ser. No. 543,838, filed 10-20-83 now U.S. Pat. No. 4,576,265 U.S. patent application Ser. No. 543,839, filed 10-20-83 now U.S. Pat. No. 4,545,265 U.S. patent application Ser. No. 544,071, filed 10-20-83 now U.S. Pat. No. 4,533,340 and U.S. patent application Ser. No. 543,840 filed 10-20-83 now U.S. Pat. No. 4,542,665.

BACKGROUND OF THE INVENTION

The present invention relates to a control system for a hydraulic automatic clutch.

In controlling a hydraulic automatic clutch of a vehicle, the clutch must be engaged smoothly for starting the vehicle. One of measures to meet this requirement is to increase a fluid pressure supplied to the hydraulic clutch in response to a revolution speed of an engine. This provides as smooth starting of the vehicle as the use of a centrifugal clutch does. However, the use of the fluid pressure variable as above poses a problem that the vehicle can not continue to travel during operation at engine speeds below a predetermined value because the clutch is released or put into a half engaged state whenever the engine speed drops below the predetermined value. This problem derives from the fact the fluid pressure variable with the engine revolution speed is used as the actuating pressure for the hydraulic clutch. For the purpose of better fuel economy, it is preferrable to operate a vehicle at lower engine revolution speeds and with a smaller reduction ratio. However, operating the vehicle in this manner is not feasible without solving the above mentioned problem.

SUMMARY OF THE INVENTION

According to the present invention, there is provided a control system for a hydraulic automatic clutch, comprising:

a hydraulic clutch having an output shaft;

a starting valve having a start fluid pressure regulating state and a complete engagement fluid pressure regulating state, the starting valve supplying to the hydraulic clutch a first regulated fluid pressure which is elevated in accordance with a revolution speed of the engine when it is in the start fluid pressure regulating state, the starting valve supplying to the hydraulic clutch a second regulated fluid pressure which is higher than the first regulated fluid pressure when it is in the complete engagement fluid pressure regulating state;

a complete engagement control valve coupled with the starting valve for rendering the starting valve operable in the complete engagement fluid pressure regulating state when the clutch complete engagement control valve is put into a predetermined state; and control means for putting the complete engagement control valve into the predetermined state when the vehicle speed increases beyond a predetermined vehicle speed.

An object of the present invention is provide a control system for a hydraulic automatic clutch wherein the complete engagement of the clutch is assured after the vehicle has started even if the engine revolution speed drops.

BRIEF DESCRIPTION OF THE DRAWINGS

FIGS. 2A and 2B, when combined, illustrate a hydraulic control system, including a control system for a hydraulic automatic clutch, for the continuously variable V-belt transmission;

FIG. 10 is a flowchart of a D-range shift pattern retrieval routine 720;

FIG. 20 is a graph showing the minimum fuel consumption rate curve expressed in terms of intake manifold vacuum and engine revolution speed;

FIG. 21 is a graph showing the minimum fuel consumption rate curve expressed in terms of fuel flow rate;

DETAILED DESCRIPTION OF THE INVENTION

Figure 1:
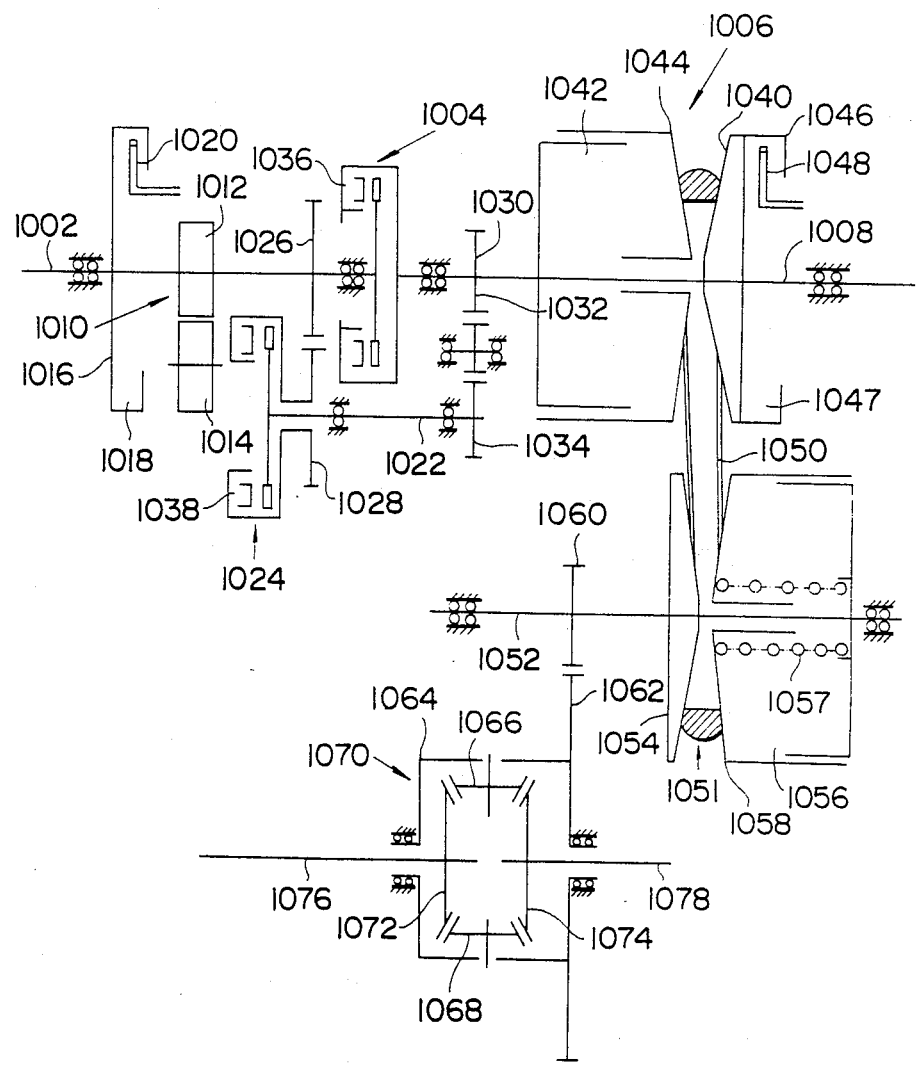
FIG. 1 is a diagrammatic view of a transmission mechanism of a continuously variable V-belt transmission.
Figure 2B:
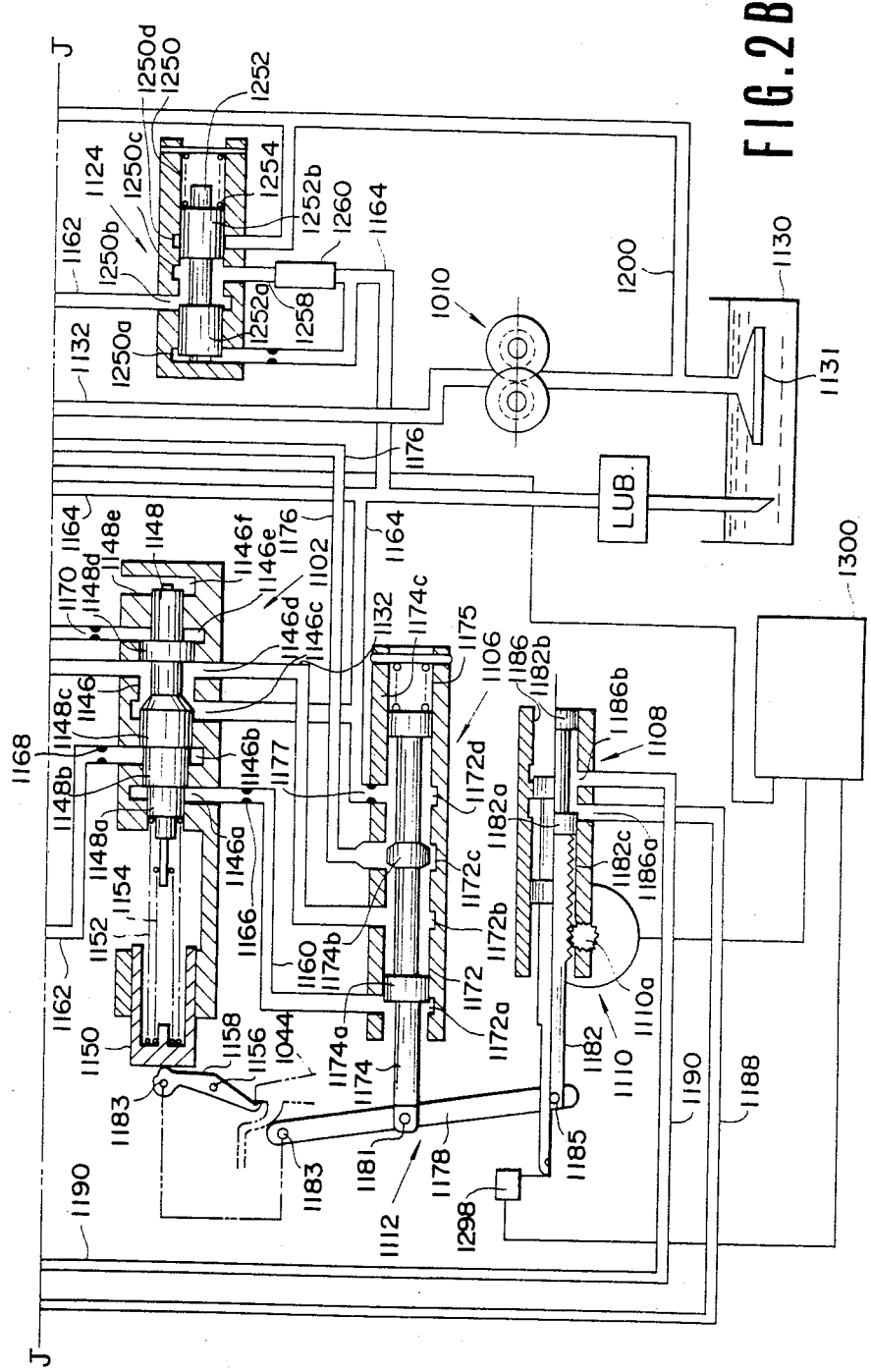
Figure 3:
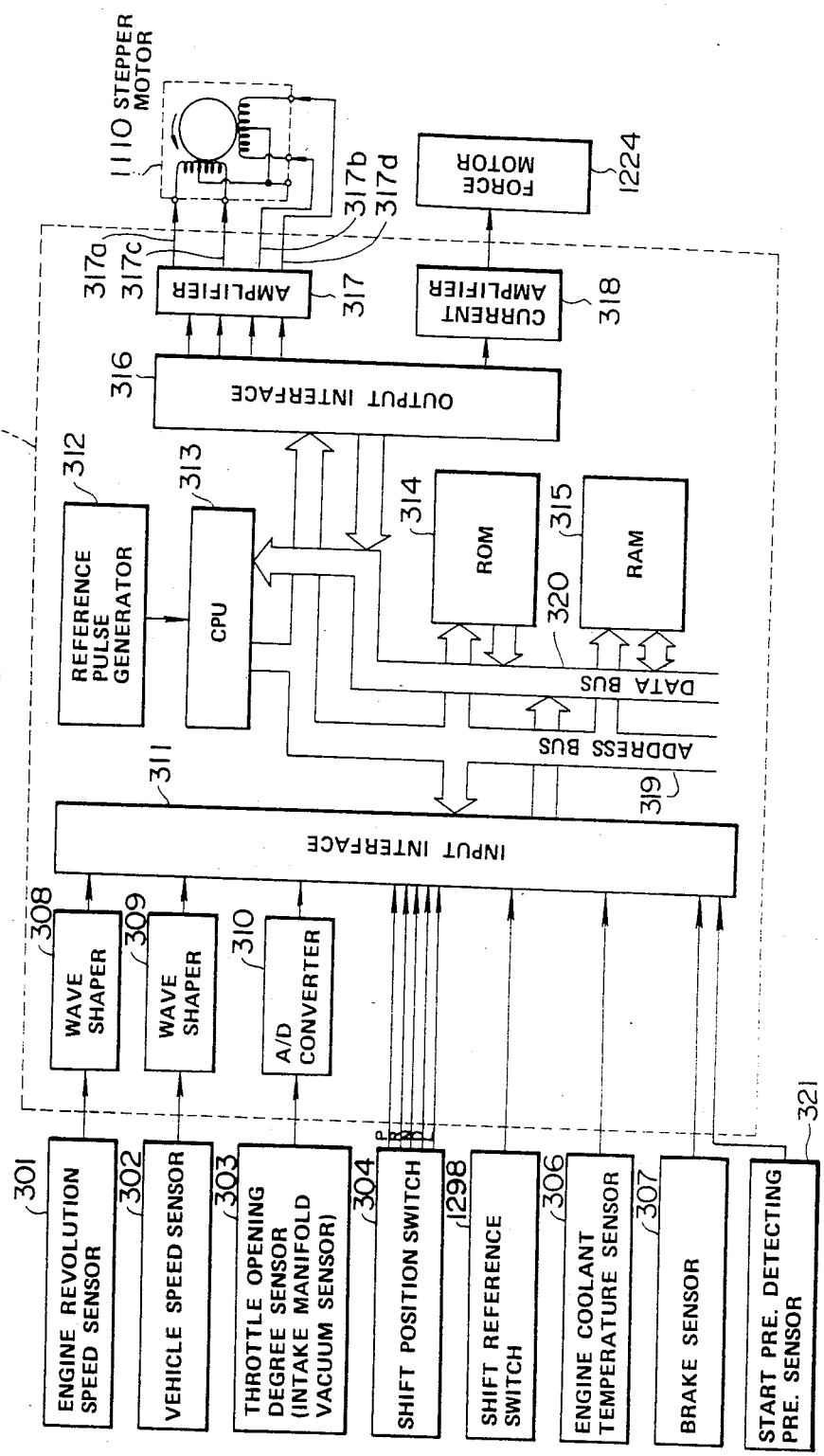
FIG. 3 is a block diagram showing an electronic control unit 1300 for controlling a stepper motor 1110 and a force motor 1224 shown in FIGS. 2A and 2B.
Figure 4:
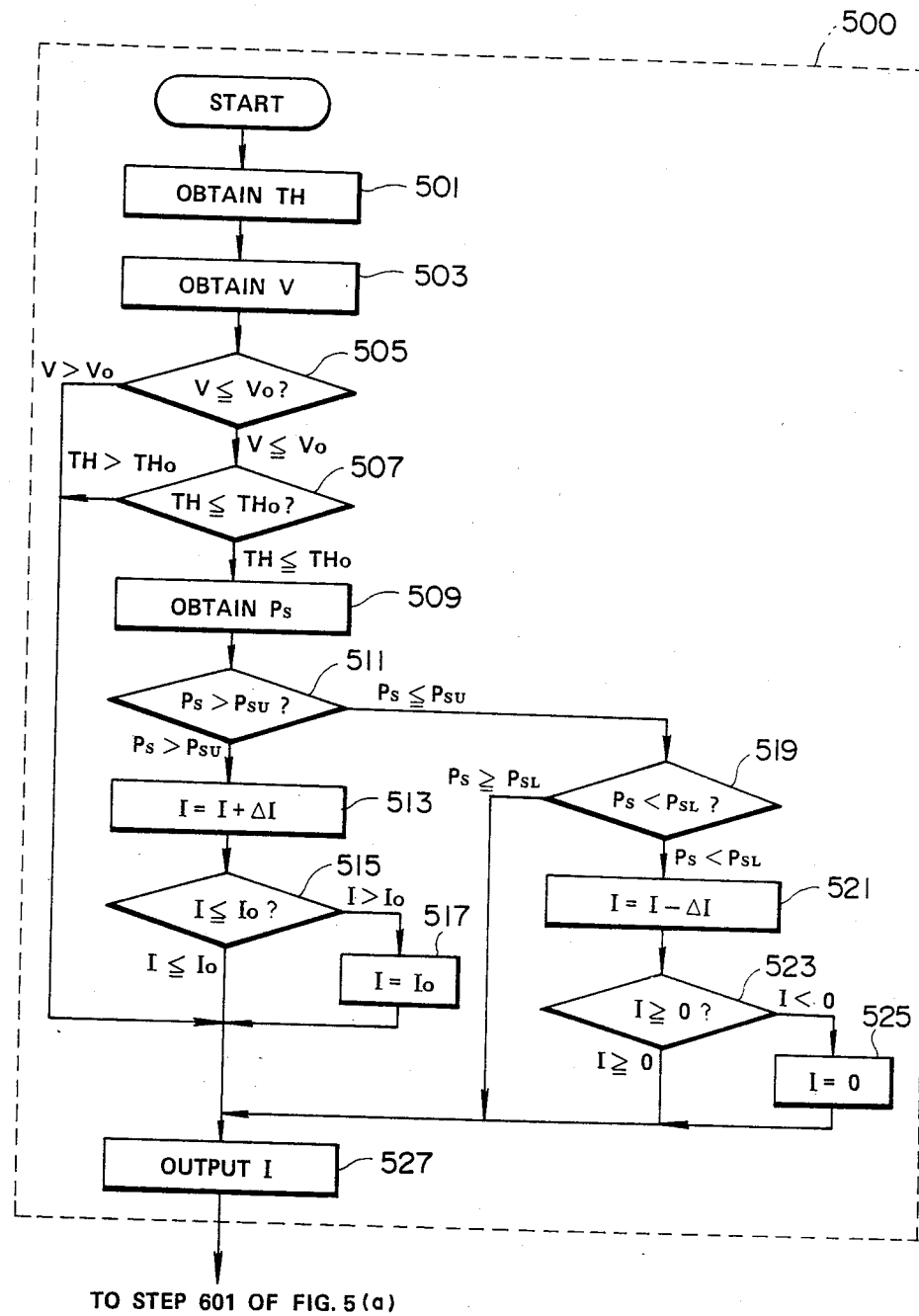
FIG. 4 is a flowchart of a force motor control routine 500 of the control system for the automatic clutch.
Figure 5:
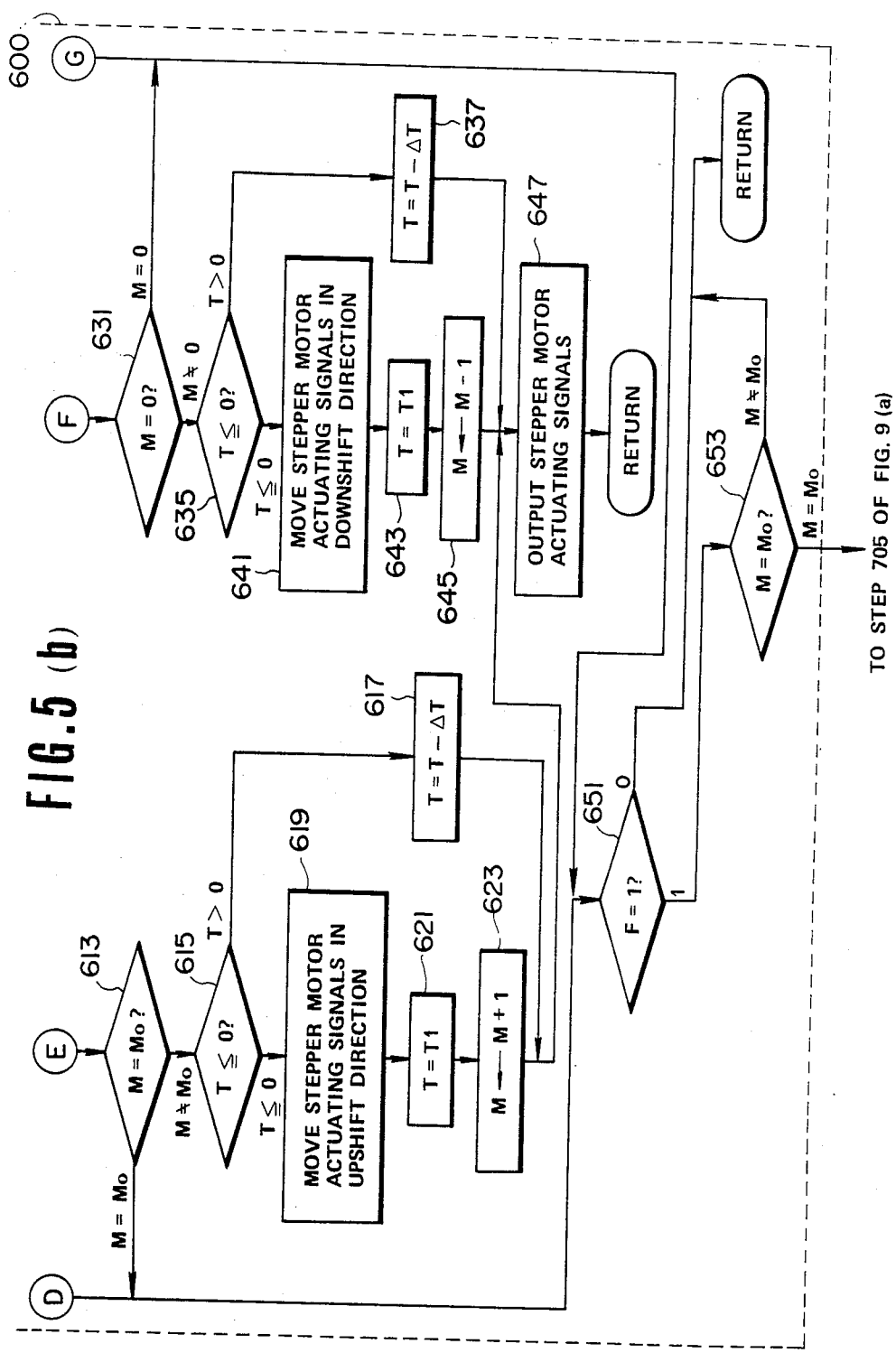
FIGS. 5(a) and 5(b), when combined, illustrate a flowchart of a complete engagement control routine 600.
Figure 6:
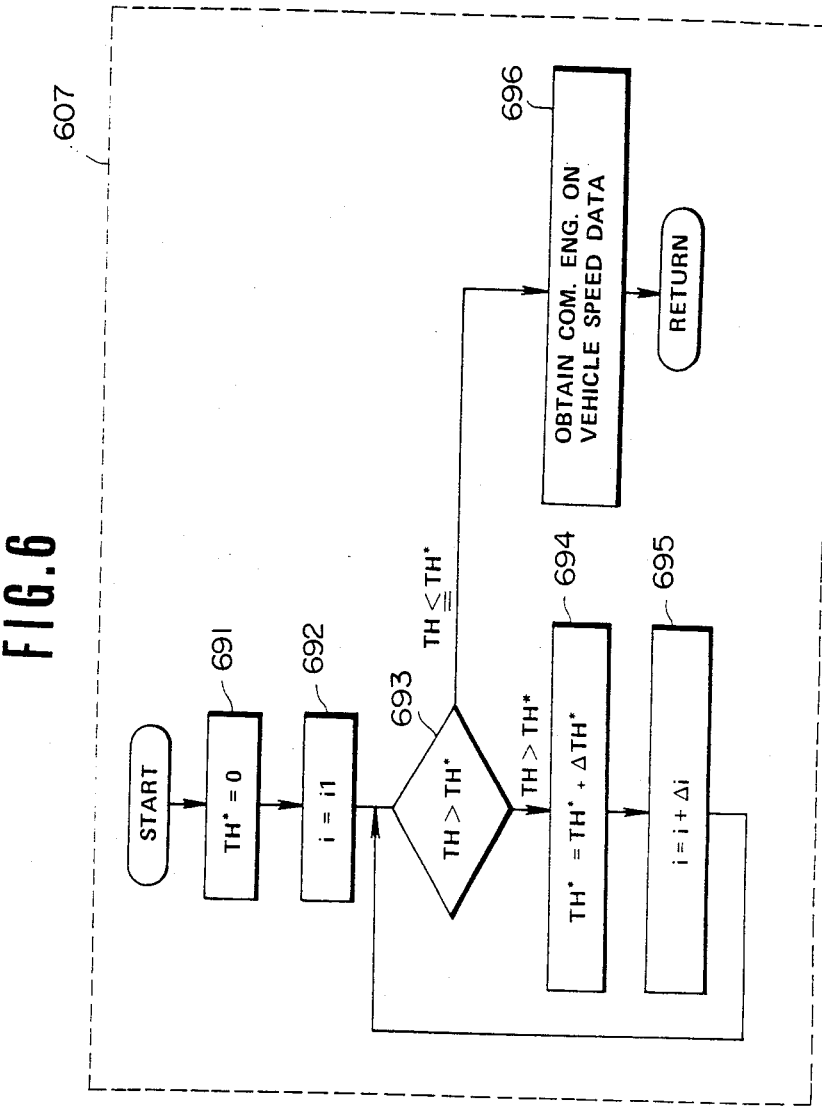
FIG. 6 is a flowchart of a data retrieval routine 607 for complete engagement on vehicle speed data Von.
Figure 7:
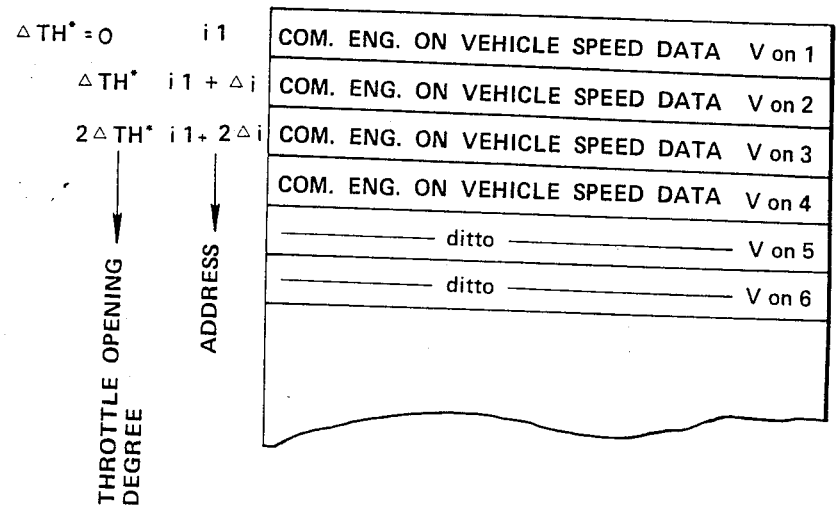
FIG. 7 is a diagrammatic view illustrating how the complete engagement on vechile speed data Von are stored in a ROM 314 shown in FIG. 3.

Referring to FIGS. 1, 2A and 2B, the transmission mechanism and the hydraulic control system used in a first embodiment according to the present invention are illustrated. The description thereof in found in the co-pending U.S. patent application Ser. No. 489,600, filed Apr. 28, 1983 (see FIGS. 24, 25A and 25B) by the same applicants and commonly assigned herewith. That portion of the disclosure of this co-pending application which relates to FIGS. 24, 25A and 25B is incorporated herein by reference in its entirety. Referring to FIGS. 2A and 2B, a stepper motor 1110 and a force motor 1224 are controlled by an electronic control unit 1300. Referring to FIGS. 3 through 21, the construction and operation of this electronic control unit 1300 in relation to the stepper motor 1110 and force motor 1224 are illustrated. The description thereof is found in the co-pending U.S. pat. appln. Ser. No. 543,838, entitled "Control System For Hydraulic Automatic Clutch" filed by the same applicants as those of the present application concurrently with the present application and claiming priorities on four Japanese patent applications Nos. 57-184627, 58-40808, 58-70095 and 58-92418. This co-pending application is incorporated hereby by reference in its entirety. Particularly, attention is directed to the description along with FIGS. 3 through 21.

Referring to FIGS. 2A and 2B, a clutch complete engagement control valve 1108 and its associated starting valve 1116 which form part of the present invention are now described.

The clutch complete engagement control valve 1108 has a spool integral with a rod 1182 of a shift operating mechanism 1112. The rod 1182 is actuable by the stepper motor 1110. The stepper motor 1110 switches the clutch complete engagement control valve 1108 in a shift pattern shown in FIG. 8 when the electronic control unit 1300 executes the steps of the complete engagement control routine 600 shown in FIGS. 5(a) and 5(b). That is, the clutch complete engagement control valve 1108 is moved to the position indicated by the upper half thereof as viewed in FIG. 2B when the vehicle speed drops below the complete engagement off vehicle speed Voff, while it is moved back to the position indicated by the lower half thereof as viewed in FIG. 2B when the vehicle speed exceeds the complete engagement on vehicle speed Von. Therefore, during operation at low vehicle speeds (i.e., during starting of the vehicle) when the clutch complete engagement control valve 1108 assumes the position indicated by the upper half therefor as viewed in FIG. 2B, a port 1186b (i.e., an oil conduit 1190) of the clutch complete engagement control valve 1108 communicates with the righthand open end, as viewed in FIG. 2B, of the bore 1186 and thus is drained via this righthand bore end, and thus a port 1204e of a starting valve 1116 is drained also. Under this condition, the starting valve 1116 is in a start oil pressure regulating state and generates a start pressure in a port 1204a as a result of pressure regulation in response to an engine revolution speed indicative oil pressure signal acting in a port 1204d and a start adjustment pressure acting in a port 1204c. This start pressure is supplied via a manual valve 1104 to a forward clutch 1004 (or a reverse clutch 1024). As the throttle opening degree TH increases, the start pressure increases in response to the engine revolution speed to engage the clutch. As the starting operation of the vehicle progresses and the vehicle speed exceeds the predetermined vehicle speed (the complete engagement on vehicle speed Von shown in FIG. 8), the clutch complete engagement control valve 1108 switches to a position wherein the port 1186a is now allowed to communicate with the port 1186b, thus allowing the drive pulley revolution speed indicative oil pressure signal to be supplied to the port 1204e of the starting valve 1116 through the oil conduit 1190. As a result, the starting valve 1116 is put into a complete engagement oil pressure regulating state and the oil pressure (start pressure) in the port 1204a regulated by the starting valve 1116 is elevated rapidly, causing a complete engagement of the forward clutch 1004 (or the reverse clutch 1024). The high level start pressure is maintained even if the engine revolution speed drops as long as the vehicle speed does not drop below the complete engagement off vehicle speed Voff (see FIG. 8). Therefore, the clutch is kept completely engaged to allow the vehicle to continue to travel at low engine revolution speeds. Subsequently, if the vehicle speed drops below the complete engagement off vehicle speed Voff shown in FIG. 8, the clutch complete engagement control valve 1108 switches back to the position as indicated by the upper half thereof as viewed in FIG. 2B, causing a drop in the start pressure. Since under this condition the clutch is released or put into a predetermined half engaged state, the engine is prevented from stalling.

Figure 8:
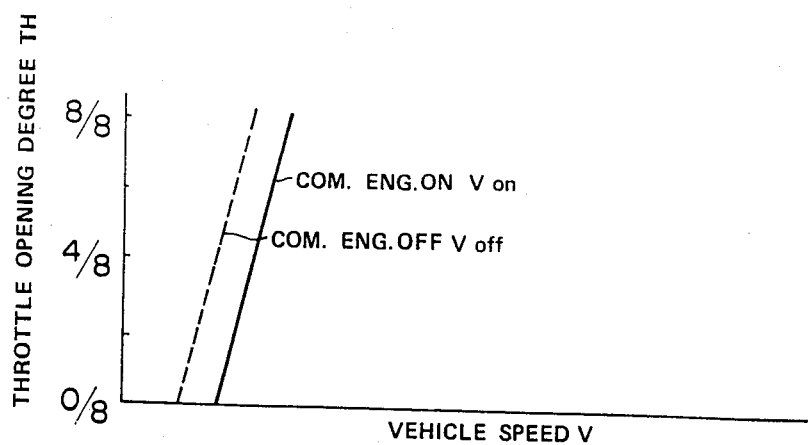
FIG. 8 is a graph showing the relationship between the complete engagement on vehicle speed Von and the complete engagement off vehicle speed Voff.
Figure 9:
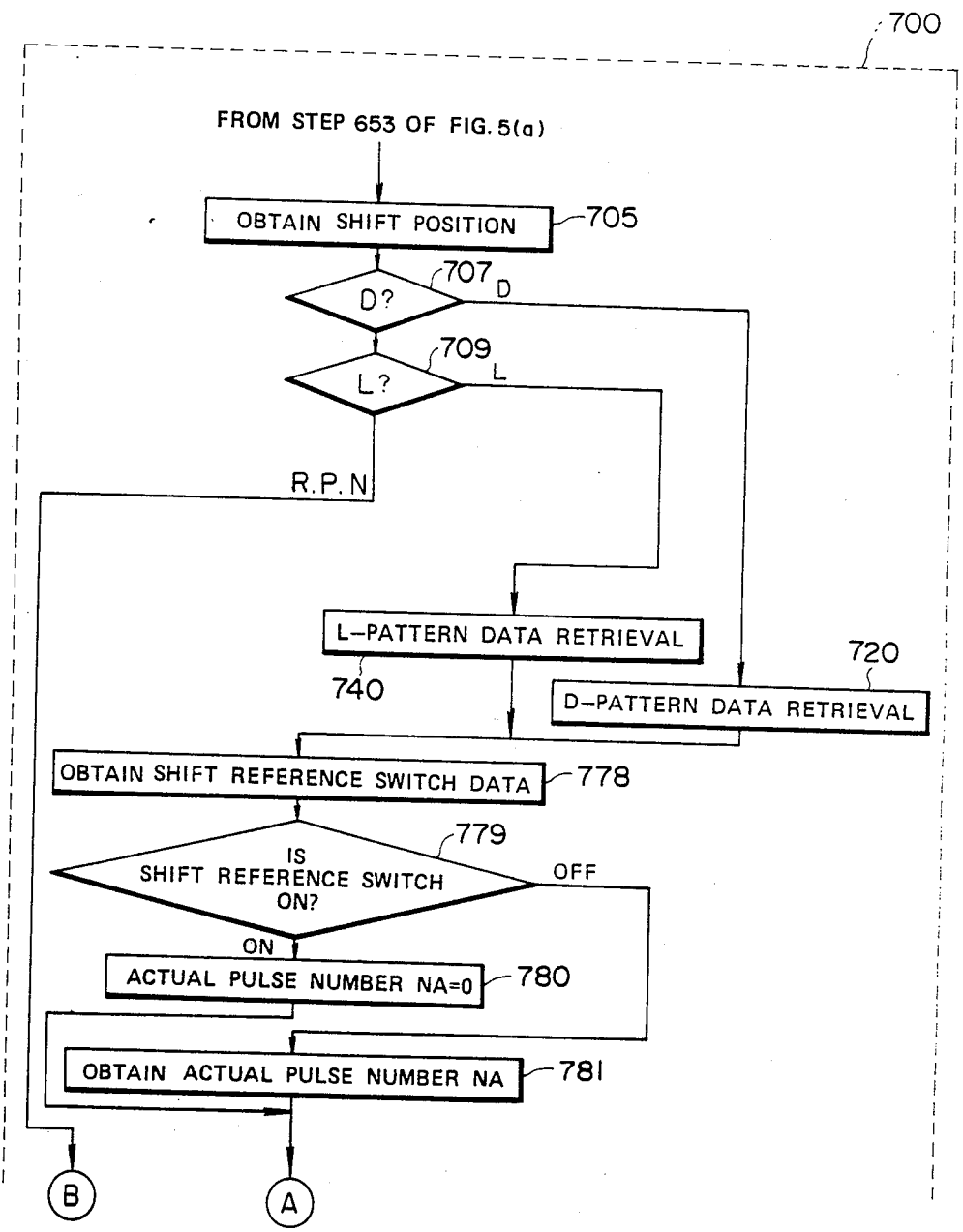
FIGS. 9(a) and 9(b), when combined, illustrate a flowchart of a stepper motor control routine 700.
Figure 9B:
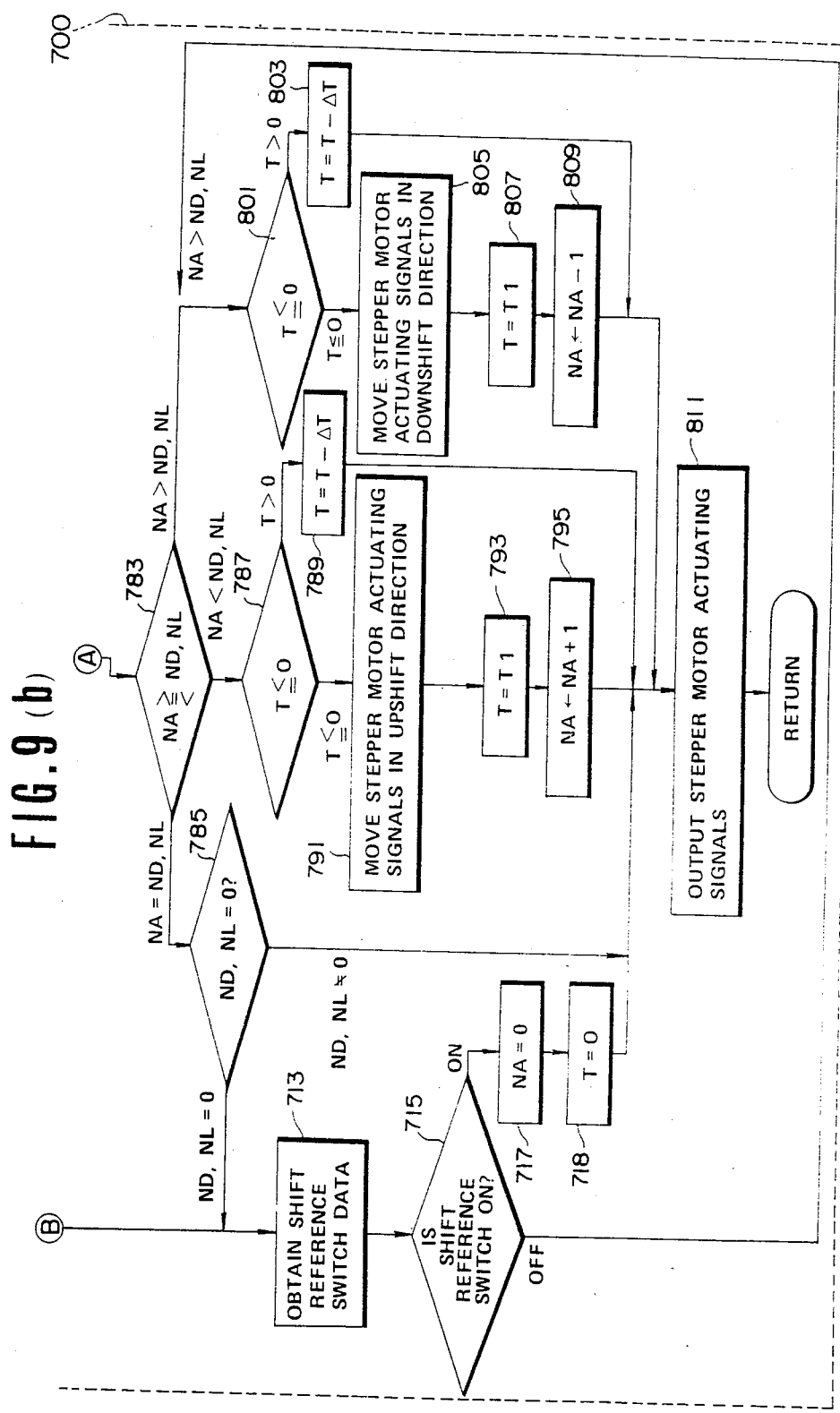
Figures 11, 12:
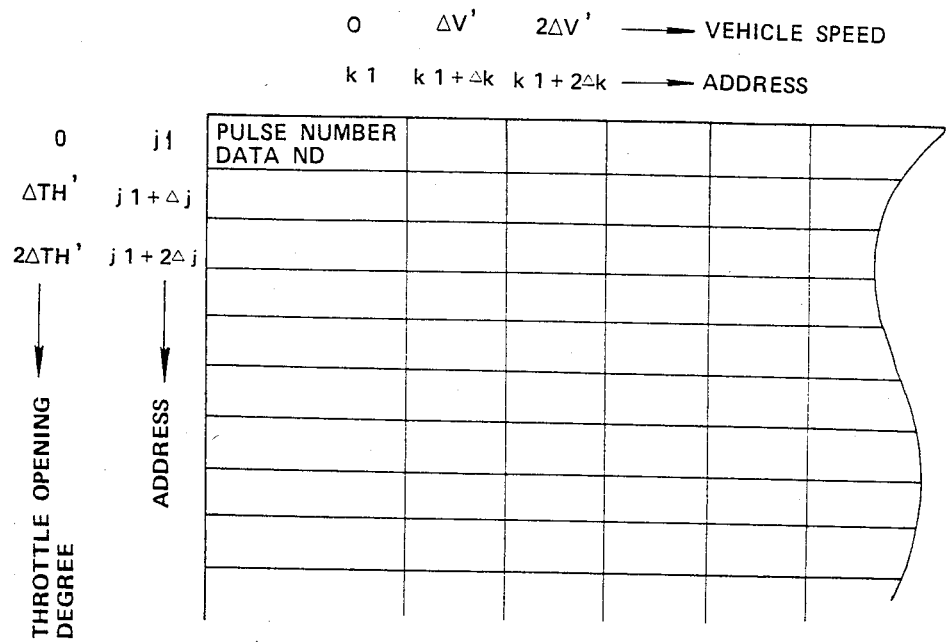
FIG. 11 is a diagrammatic view illustrating how pulse number data ND are stored in a matrix in the ROM 314 versus throttle opening degree TH and vehicle speed V.
FIG. 12 is a chart illustrating various modes of stepper motor actuating signals applied to output leads 317a, 317c, 317b and 317d of the stepper motor 1110.
Figure 13:
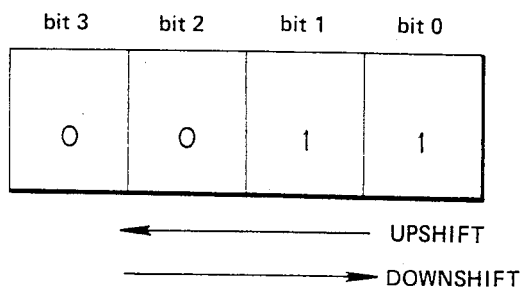
FIG. 13 is a diagrammatic view of the content of four bit positions corresponding to the mode A.
Figure 14:
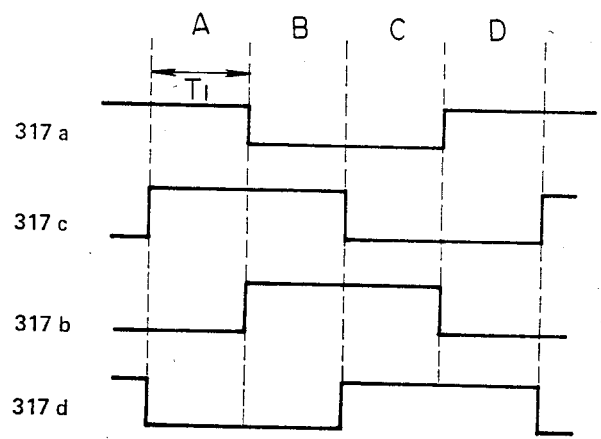
FIG. 14 is a timing diagram of the stepper motor actuating signals.
Figure 15:
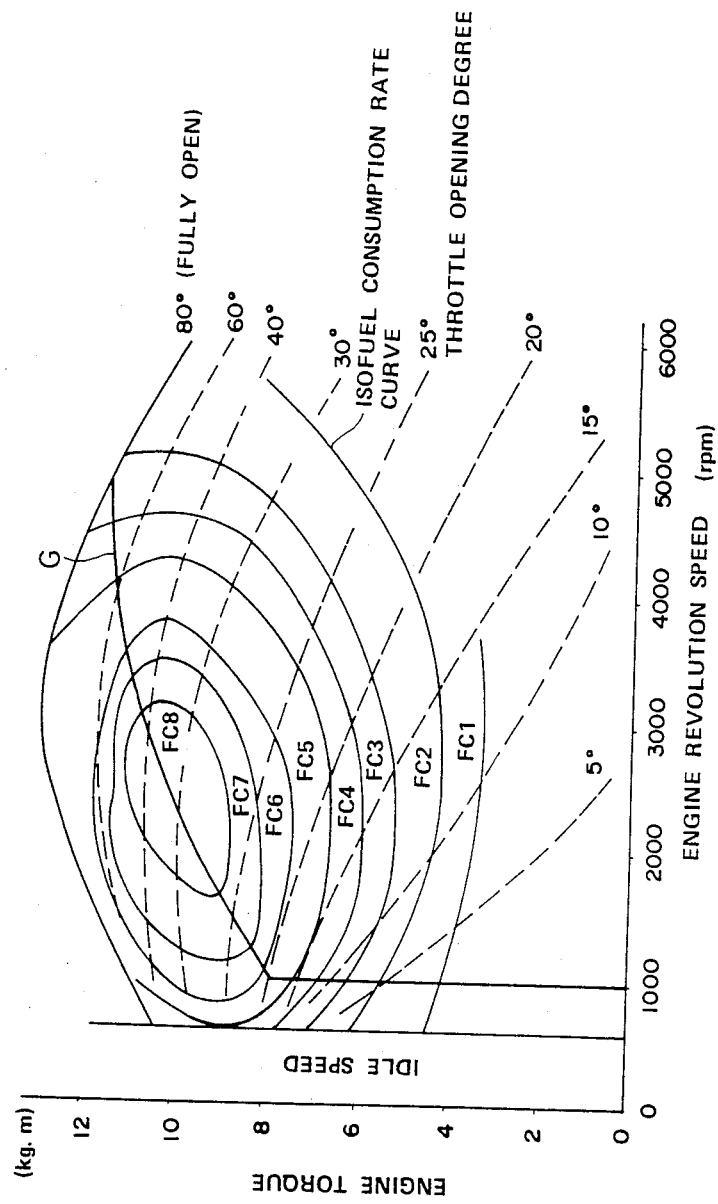
FIG. 15 is a graph showing a minimum fuel consumption rate curve G.
Figure 16:
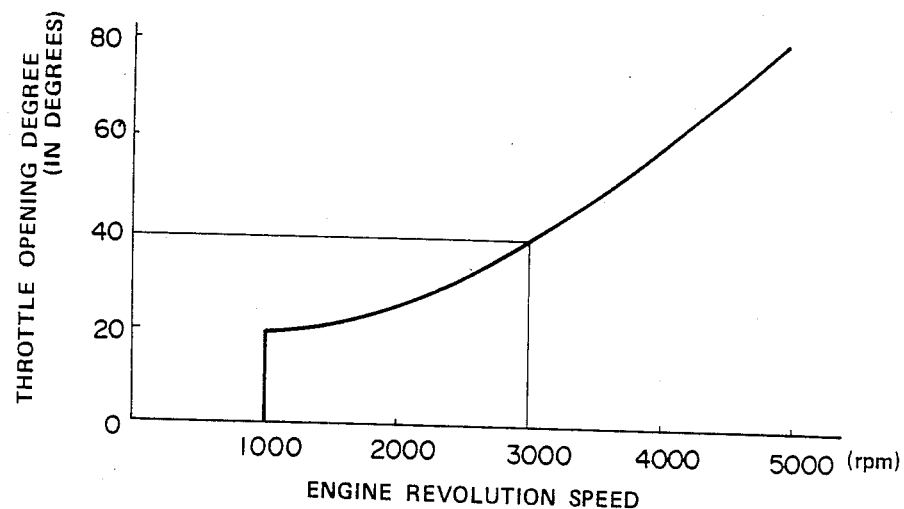
FIG. 16 is a graph showing the mininmum fuel consumption rate curve expressed in terms of the throttle opening degree and engine revolution speed.
Figure 17:
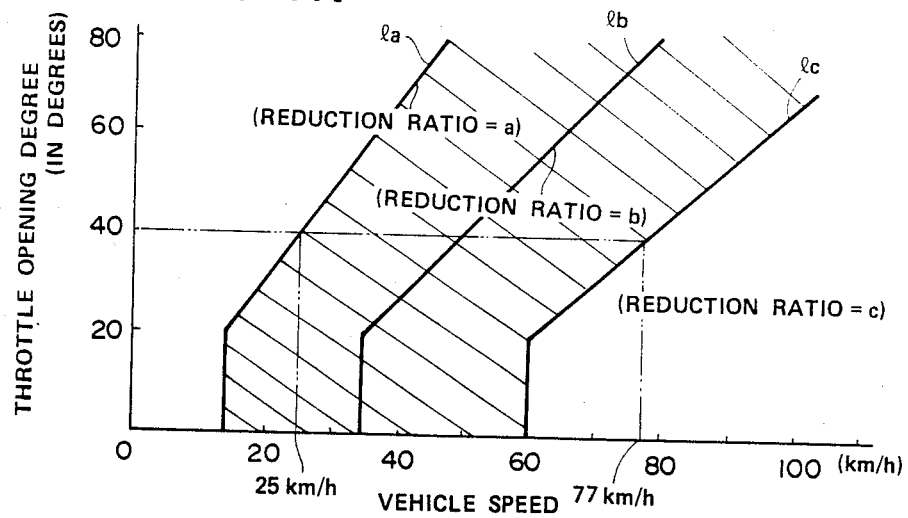
FIG. 17 is a graph showing the relationship shown in FIG. 16 expressed in terms of the throttle opening degree and vehicle speed for various reduction ratios.
Figure 18:
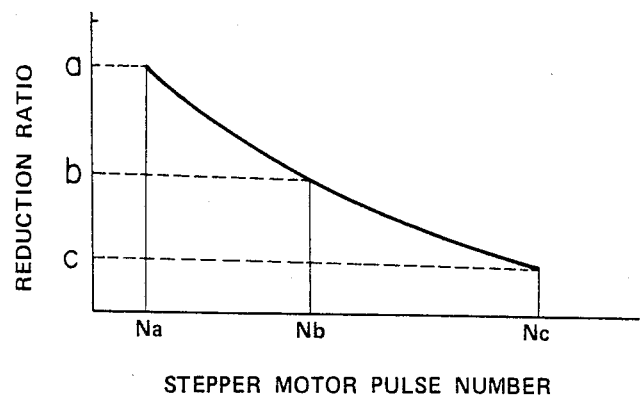
FIG. 18 is a graph showing a predetermined relationship of the reduction ratio with the stepper motor pulse number.
Figure 19:
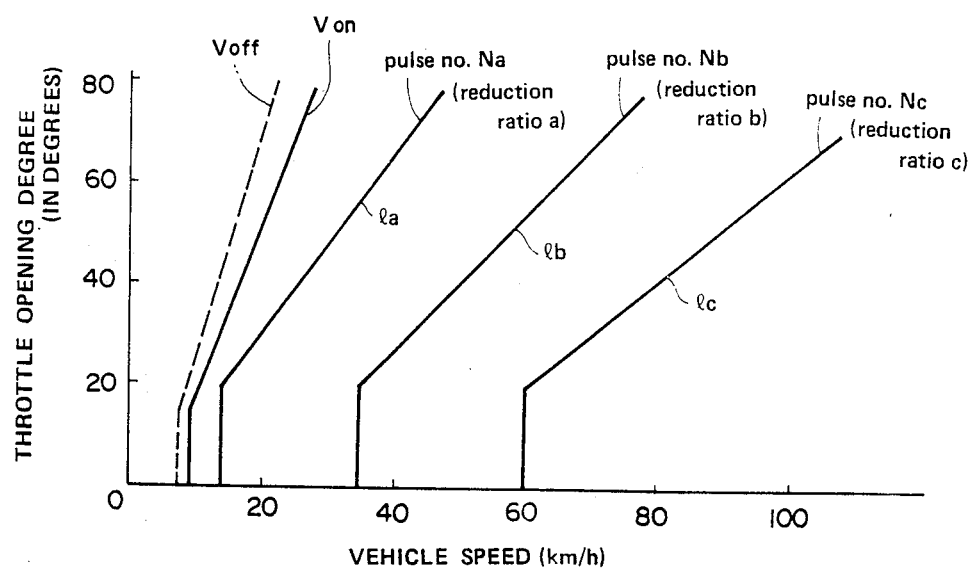
FIG. 19 is a graph showing the predetermined relationship shown in FIG. 16 expressed in terms of the throttle opening degree and vehicle speed for various pulse numbers.

In the first embodiment described above, the clutch is completely engaged in the predetermined pattern as shown in FIG. 8 wherein a fixed predetermined complete engagement on vehicle speed Von is given for the same throttle opening degree regardless of a change in the other operating conditions, such as an increase in idle revolution speed of an engine owing to the use of a choke or a compressor of an air conditioner. The complete engagement on vehicle speed Von is chosen such that it is slightly higher than a vehicle speed corresponding to a stall revolution speed. The term "stall revolution speed" is hereby used to mean an engine revolution speed at which an engine torque agrees with a clutch transmission torque. The stall revolution speed is subject to a change if the idle revolution speed changes and it increases as the idle revolution speed increases. Thus, if the complete engagement on vehicle speed Von is set slightly higher than the corresponding vehicle speed to the stall revolution speed for the normal idle revolution speed during stable idle operation of the engine, it cannot be neglected that this complete engagement on vehicle speed Von is exceeded by the corresponding vehicle speed to the stall revolution speed for an increased idle revolution speed. In this case, the clutch is completely engaged while the clutch is still in the partially or half engaged state, thus producing substantial shocks.

The second embodiment which will be described hereinafter has an object to solve the above mentioned problem by correcting the complete engagement on vehicle speed in response to a variation in idle revolution speed.

Figure 22:
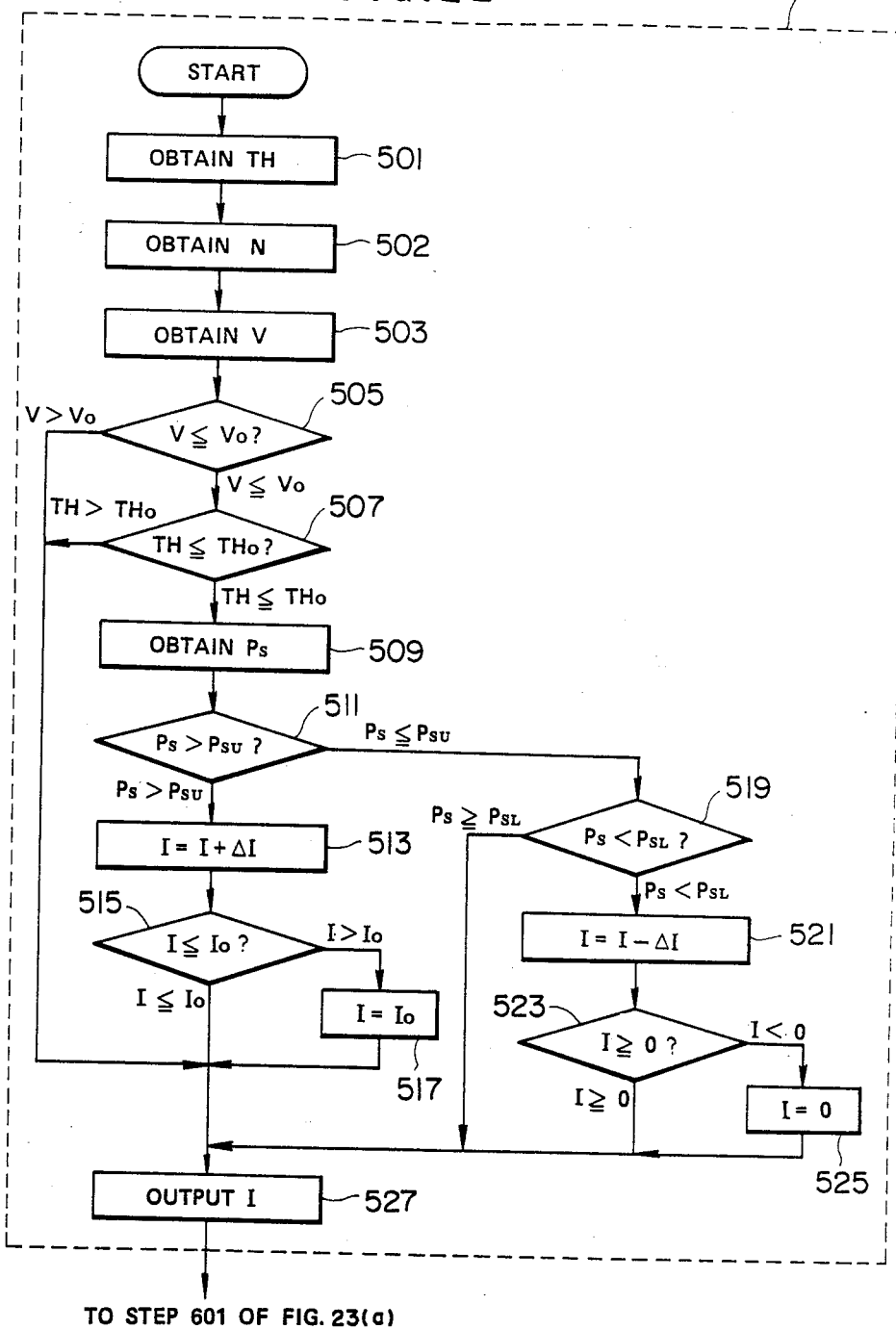
FIG. 22 is a similar flowchart to FIG. 4 illustrating a force motor control routine 500A used in a second embodiment of a control system according to the present invention.
Figure 23A:
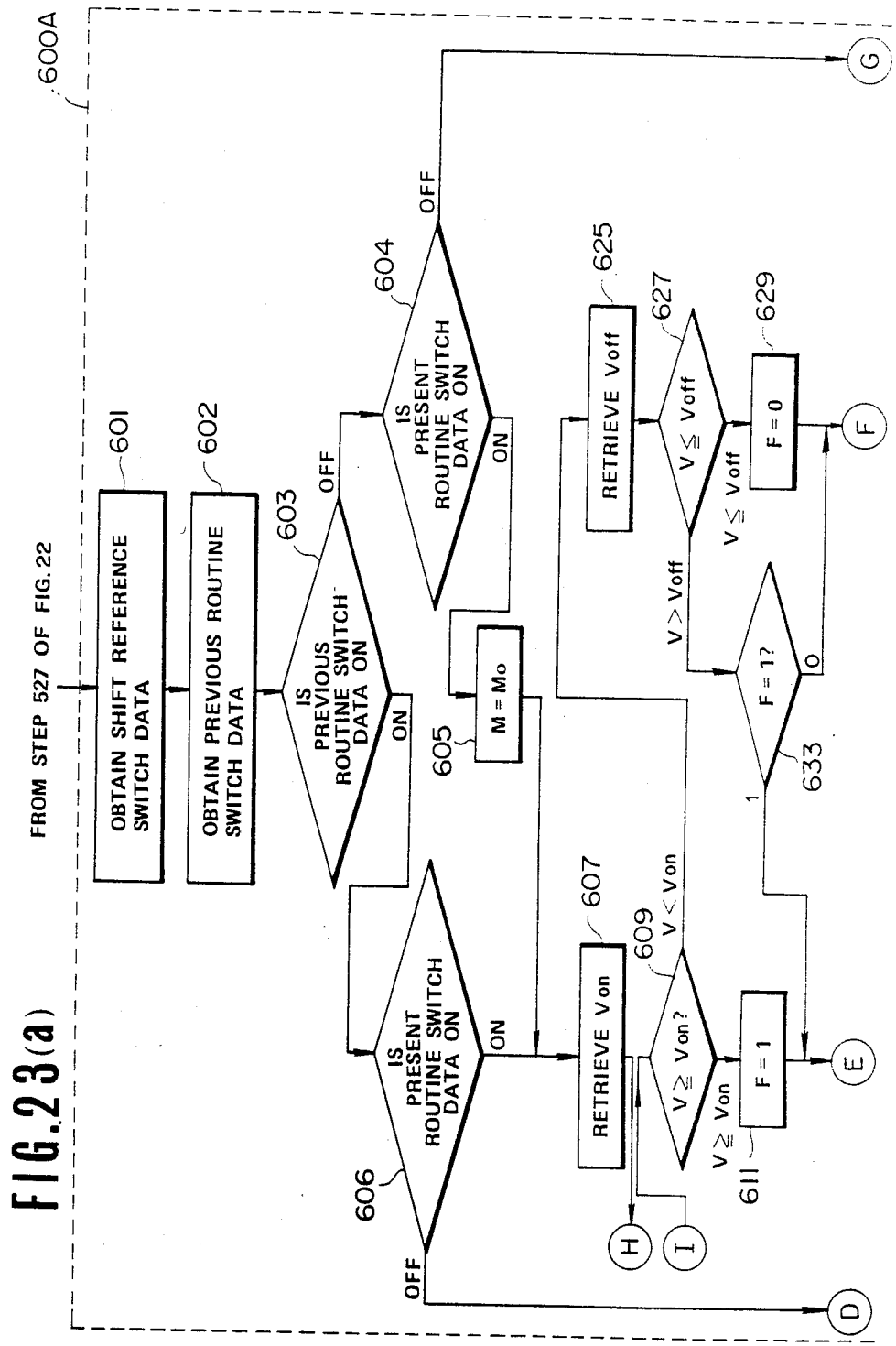
FIGS. 23(a), 23(b) and 23(c), when combined, illustrate a flowchart of a complete engagement control routine 600A used in the second embodiment.
Figure 23B:
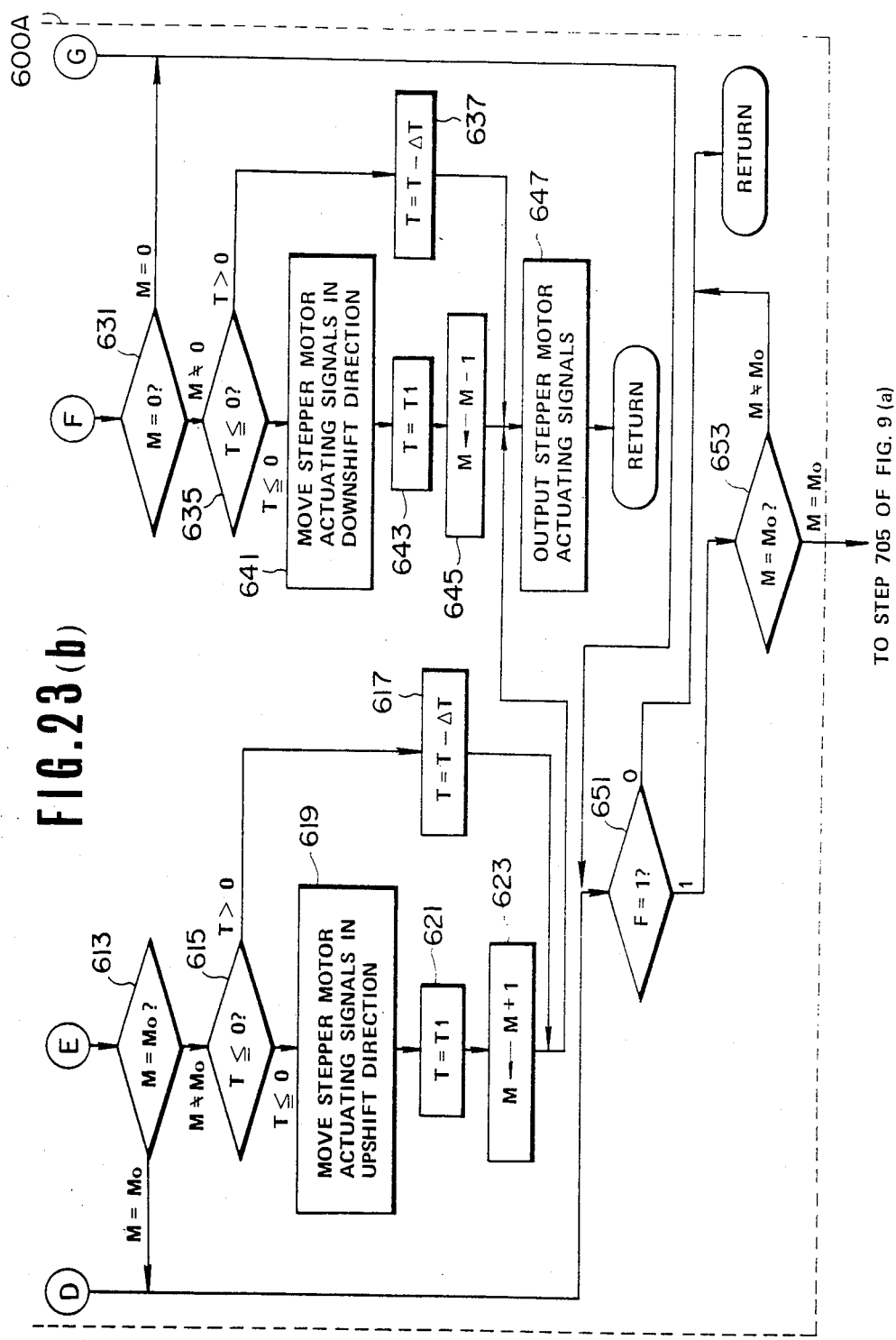
Figure 23:
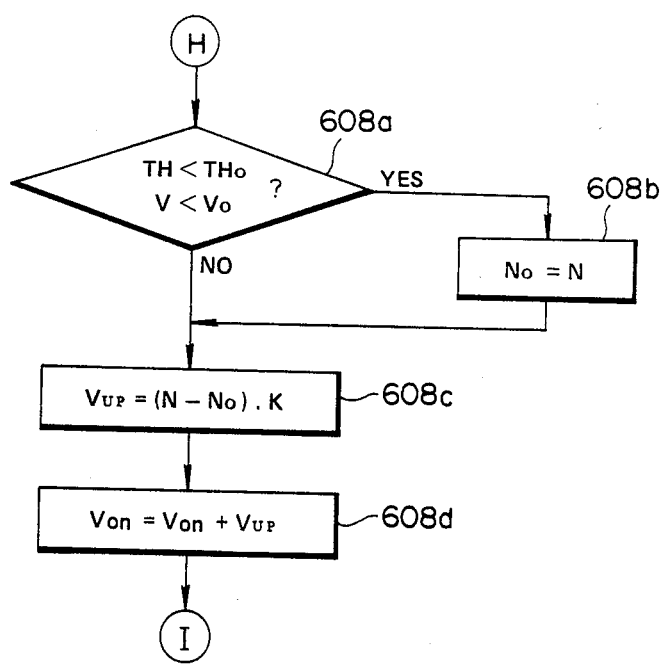

This second embodiment is substantially the same as the first embodiment, but different in that a force motor control routine 500A (see FIG. 22) and a complete engagement control routine 600A (see FIGS. 23(a), 23(b) and 23(c)) are used instead of the counterparts in the first embodiment. The force motor control routine 500A is substantially identical with the routine 500 shown in FIG. 4 except the provision of a step 502 of obtaining an engine revolution speed N. Thus, like reference numerals are used to designate like steps in FIGS. 4 and 22 for the ease of comparison. The complete engagement control routine 600A is also identical with the routine 600 shown in FIGS. 5(a) and 5(b) except the provision of a complete engagement on vehicle speed correction flow which includes steps 608a, 608b, 608c and 608d as shown in FIG. 23(c). Thus, like reference numerals are used to designate like steps throughout FIGS. 5(a), 5(b), 23(a), 23(b) and 23(c) for ease of comparison.

Referring particularly to FIGS. 23(c), the complete engagement on vehicle speed correction flow is now described. After having obtained the complete engagement on vehicle speed Von from the stored data in step 607, the program goes to step 608a wherein a determination is made whether the actual throttle opening degree TH is less than a predetermined small value THo and at the same time the actual vehicle speed V is less than a predetermined small value Vo. If TH is less than THo and V is less than Vo (i.e., an idle state with the vehicle at a standstill), the program goes to step 608b wherein No is given a current engine revolution speed, i.e., the value N obtained in step 502 (see FIG. 22). After step 608b, step 608c is executed. If, in step 608a, TH is greater than or equal to THo and/or V is greater than or equal to Vo, the step 608c is executed wherein an arithmetic operation of an equation as follows is performed, $$V_{up} = (N - N_o) \cdot K.$$

where:
N is a current engine revolution speed;
No is the latest value in idle revolution speed;
K is a constant.

The constant K is empirically determined taking into account the largest reduction ratio of the continuously variable transmission and the final reduction ratio of the vehicle and so chosen as to set the corrected value Vup at a predetermined vehicle speed value.

Thereafter, in step 608d, the complete engagement on vehicle speed Von which has been obtained as described before is increased by the correction value Vup. In the following flow after branch point I, the complete engagement on vehicle speed Von obtained in step 608d is used.

As described above, according to the second embodiment, the complete engagement on vehicle speed Von is corrected and is always maintained higher than the corresponding vehicle speed to the stall revolution speed, the substantial shocks are avoided even if the idle revolution is increased.

What is claimed is:

1. A control system for a hydraulic automatic clutch of a vehicle having an engine with a throttle which opens in degrees, comprising:
 a hydraulic clutch having an output shaft;
 an engine revolution speed sensor means for generating an engine revolution fluid pressure signal indicative of the revolution speed of the engine;
 a vehicle speed sensor means for generating a vehicle speed indicative signal indicative of the vehicle speed;
 a starting valve means having a start fluid pressure regulating state and a complete engagement fluid pressure regulating state, said starting valve means being coupled with said engine revolution speed sensor means for generating a start fluid pressure in response to said engine revolution fluid pressure signal when said starting valve means is in said start fluid pressure regulating state, said starting valve means increasing fluid pressure from said start fluid pressure to generate a complete engagement fluid pressure when said starting valve means is in said complete engagement fluid pressure regulating state, said start fluid pressure and said complete engagement fluid pressure being supplied to said hydraulic clutch;
 a complete engagement control means coupled with said starting valve means for rendering said starting valve means operable in said complete engagement fluid pressure regulating state when said complete engagement control means is put into a predetermined state;
 control means including means for generating a predetermined vehicle speed indicative signal indicative of a predetermined vehicle speed, said control means being responsive to said vehicle speed indicative signal for putting said complete engagement control means into said predetermined state when said vehicle speed indicative signal increases beyond said predetermined vehicle speed indicative signal.

2. A control system as claimed in claim 1,
 wherein said complete engagement control means comprises means for generating a complete engagement fluid pressure signal, and a complete engagement control valve means for supplying said complete engagement fluid pressure signal to said starting valve means when it is put into said predetermined state, and wherein said starting valve means includes a bore having a first port receiving said engine revolution fluid pressure signal and a second port receiving said complete engagement fluid pressure signal, and said starting valve means also includes a spool slidably disposed in said bore and having a first pressure acting area exposed to said engine revolution fluid pressure signal in said first port and a second pressure acting area exposed to said complete engagement fluid pressure signal which is applied to said second port when said complete engagement control means is put into said predetermined state, said spool being urged in the same direction when said second pressure acting area is exposed to said complete engagement fluid pressure as is done when said first pressure acting area is exposed to said engine revolution fluid pressure signal.

3. A control system as claimed in claim 2, wherein said spool of said starting valve means is urged in said direction when said engine revolution fluid pressure signal is applied to said first pressure acting area, and said spool of said starting valve means is urged in the same direction when said complete engagement fluid pressure signal is applied to said second pressure acting area.

4. A control system as claimed in claim 2, wherein said complete engagement fluid pressure signal generating means is in the form of means for detecting a revolution speed of said hydraulic clutch and generating a clutch output shaft indicative signal indicative of the revolution speed of the output shaft of said hydraulic clutch so that said complete engagement fluid pressure signal is elevated in accordance with an increase in said revolution speed of said output shaft of said hydraulic clutch.

5. A control system as claimed in claim 1, wherein said predetermined vehicle speed indicative signal generating means comprises an engine revolution speed sensor means for detecting a revolution speed of the engine and generating an engine revolution electric signal indicative of the revolution speed of the engine detected, a throttle opening degree sensor means for detecting an opening degree of the throttle and generating a throttle opening degree electric signal indicative of the opening degree of the throttle detected, a memory means for storing said engine revolution electric signal as the latest idle revolution speed when said vehicle speed indicative signal is lower than a predetermined value and said throttle opening degree indicative signal is lower than a predetermined value, said predetermined vehicle speed indicative signal generating means determines said complete engagement vehicle speed appropriate for said throttle opening degree indicative signal and for the latest idle revolution speed stored in said memory means, said control means compares said vehicle speed indicative signal with said complete engagement vehicle speed indicative signal to generate a command signal when said vehicle speed indicative signal has a predetermined relation with said complete engagement vehicle speed indicative signal, said command signal being supplied to said clutch complete engagement control means to put same into said predetermined state.

6. A control system as claimed in claim 5, wherein said predetermined vehicle speed indicative signal generating means includes means for storing a table containing predetermined complete engagement vehicle speed data for various throttle opening degrees, and said predetermined vehicle speed indicative signal generating means retrieves the data in said table to determine the complete engagement vehicle speed for the throttle opening degree indicative signal, determines a correction value by multiplying a constant with a result of subtraction of said latest idle revolution speed stored in said memory means from an actual engine revolution speed indicated by said engine revolution electric signal, and increases said complete engagement vehicle speed indicative signal by said correction value, and said control means compares said vehicle speed indicative signal with said complete engagement vehicle speed indicative signal which has been increased by said correction value so as to generate said command signal.

* * * * *